United States Patent
Choi

(10) Patent No.: US 9,969,061 B2
(45) Date of Patent: *May 15, 2018

(54) MAGNETIC SUBSTANCE HOLDING DEVICE

(71) Applicant: Tae Kwang Choi, Gwangmyeong-si (KR)

(72) Inventor: Tae Kwang Choi, Gwangmyeong-si (KR)

( * ) Notice: Subject to any disclaimer, the term of this patent is extended or adjusted under 35 U.S.C. 154(b) by 428 days.

This patent is subject to a terminal disclaimer.

(21) Appl. No.: 14/639,927

(22) Filed: Mar. 5, 2015

(65) Prior Publication Data

US 2016/0207176 A1    Jul. 21, 2016

(30) Foreign Application Priority Data

Jan. 21, 2015  (KR) .......................... 10-2015-0010094

(51) Int. Cl.
  *B23Q 3/154*  (2006.01)
  *B25B 11/00*  (2006.01)
  (Continued)

(52) U.S. Cl.
  CPC .......... *B25B 11/002* (2013.01); *B23Q 3/1543* (2013.01); *H01F 7/206* (2013.01);
  (Continued)

(58) Field of Classification Search
  CPC . B25B 11/00; B23Q 3/1546; H01F 2007/085; H01F 7/02; H01F 7/0252; H01F 7/206
  (Continued)

(56) References Cited

U.S. PATENT DOCUMENTS 3,316,514 A * 4/1967 Radus .................... H01F 7/206
                                                        335/291
3,336,551 A * 8/1967 Stead ................... B23Q 3/1546
                                                        269/8
(Continued)

FOREIGN PATENT DOCUMENTS

WO    WO 2009069146 A1 *  6/2009  ........... B23Q 3/1546

*Primary Examiner* — Christopher M Koehler
*Assistant Examiner* — Seahee Yoon
(74) *Attorney, Agent, or Firm* — AEON Law, PLLC; Adam L. K. Philipp; Manasi Vakil

(57) ABSTRACT

A magnetic substance holding device includes: a first pole piece assembly comprising at least one first pole piece, at least two second pole pieces, and at least two first permanent magnets; a second pole piece assembly comprising at least one third pole piece, at least two fourth pole pieces, and at least two second permanent magnets; a coil; and a control device. The first pole piece assembly and/or the second pole piece assembly is configured to be movable such that they are switched between a first arrangement in which the second faces of the first pole piece assembly are spaced apart from the first faces of the second pole piece assembly, and a second arrangement in which the second faces of the first pole piece assembly come in contact with the first faces of the second pole piece assembly. The control device controls holding and detaching of a workpiece on and from the first faces of the first pole piece assembly or the second faces of the second pole piece assembly, by way of controlling electric current applied to the coil to switch between the first arrangement and the second arrangement.

14 Claims, 14 Drawing Sheets

(51) Int. Cl.
*H01F 7/20* (2006.01)
*H01F 7/02* (2006.01)
*H01F 7/08* (2006.01)

(52) U.S. Cl.
CPC .............. *H01F 7/02* (2013.01); *H01F 7/0252* (2013.01); *H01F 7/0257* (2013.01); *H01F 2007/085* (2013.01)

(58) Field of Classification Search
USPC .............................. 269/8; 335/285, 289, 290
See application file for complete search history.

(56) References Cited

U.S. PATENT DOCUMENTS

| | | | | |
|---|---|---|---|---|
| 3,386,156 | A * | 6/1968 | Griesemer | H05K 13/028 269/8 |
| 3,854,711 | A * | 12/1974 | Dong | B23Q 3/154 269/8 |
| 4,471,331 | A * | 9/1984 | Wyatt | B23Q 3/1546 310/90.5 |
| 4,663,602 | A * | 5/1987 | Pignataro | B23Q 3/1546 335/286 |
| 4,847,582 | A * | 7/1989 | Cardone | B23Q 3/1546 335/289 |
| 6,489,871 | B1 * | 12/2002 | Barton | H01F 7/206 335/285 |
| 7,619,499 | B2 * | 11/2009 | Wieler | H01H 5/02 269/8 |
| 7,782,164 | B2 * | 8/2010 | Tiberghien | B25B 11/002 335/285 |
| 7,940,149 | B2 * | 5/2011 | Lee | B23Q 3/1546 269/8 |
| 2008/0290973 | A1 * | 11/2008 | Sarda | B23Q 3/1543 335/295 |
| 2010/0013583 | A1 * | 1/2010 | Kimura | B29C 45/1742 335/294 |
| 2010/0301532 | A1 * | 12/2010 | Cardone | B25B 11/002 269/8 |
| 2011/0272537 | A1 * | 11/2011 | Gindy | B25B 1/2421 248/201 |
| 2013/0135067 | A1 * | 5/2013 | Choi | H01F 7/206 335/290 |
| 2014/0049347 | A1 * | 2/2014 | Barton | B25B 11/002 335/290 |
| 2014/0361860 | A1 * | 12/2014 | Choi | H01F 7/04 335/295 |
| 2015/0279541 | A1 * | 10/2015 | Choi | H01F 7/206 361/145 |
| 2015/0287510 | A1 * | 10/2015 | Choi | H01F 7/206 361/145 |
| 2015/0367484 | A1 * | 12/2015 | Choi | H01F 7/02 269/8 |
| 2017/0103839 | A1 * | 4/2017 | Choi | H01F 7/064 |
| 2017/0133136 | A1 * | 5/2017 | Choi | H01F 7/064 |

* cited by examiner

[fig. 1A]
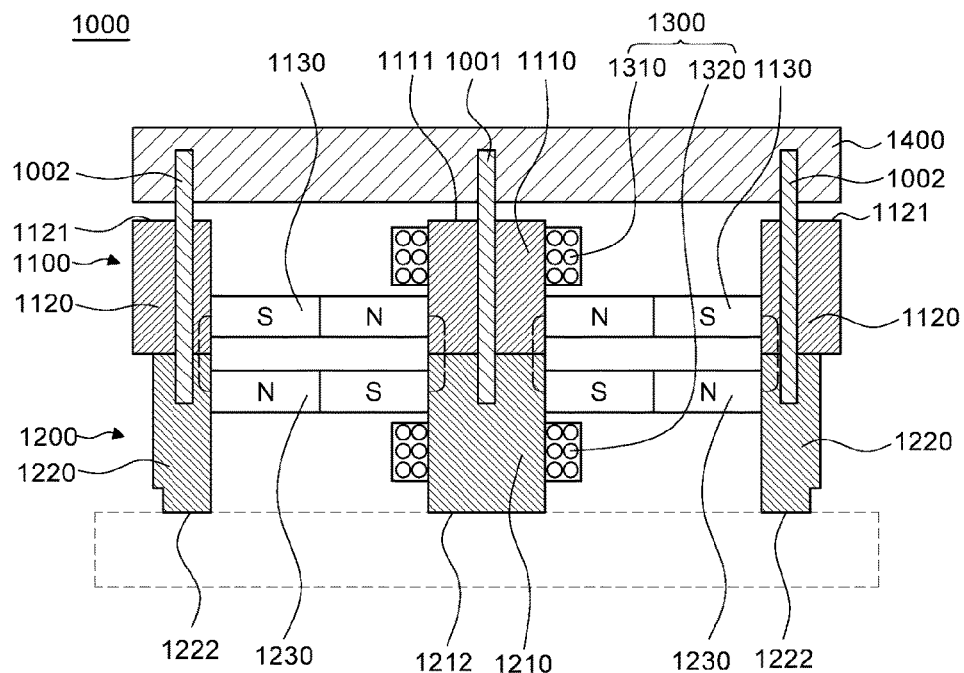
[fig. 1B]
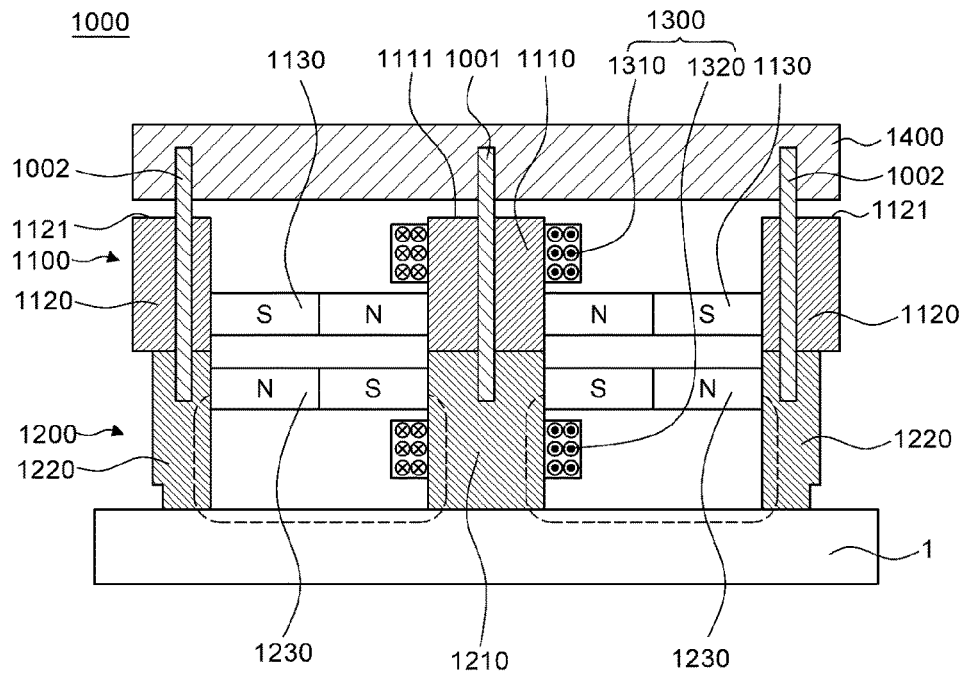

[fig. 1C]
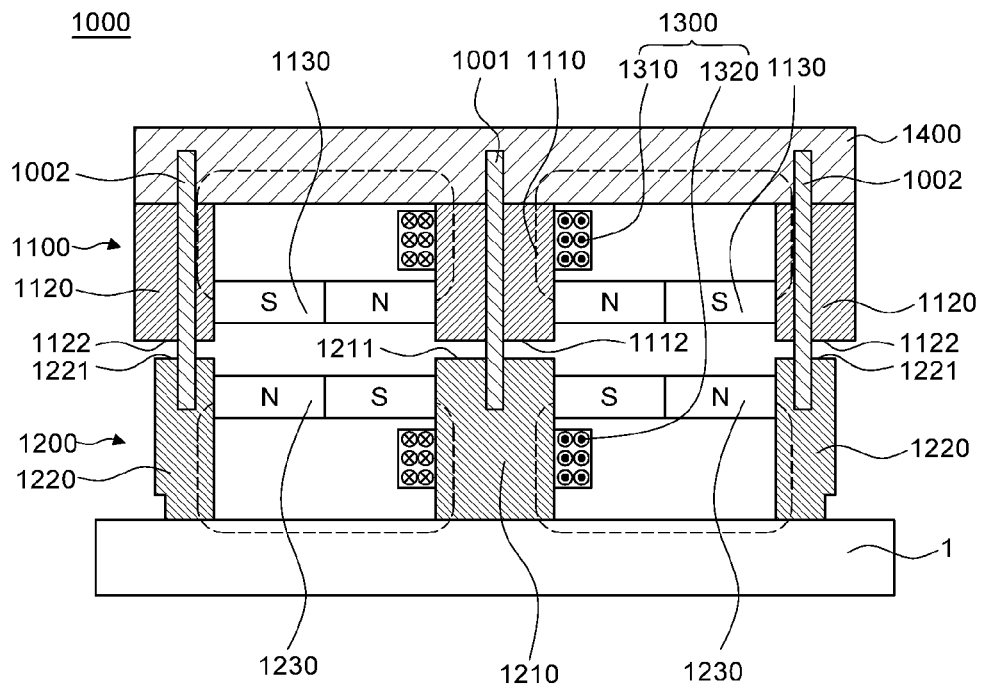
[fig. 1D]
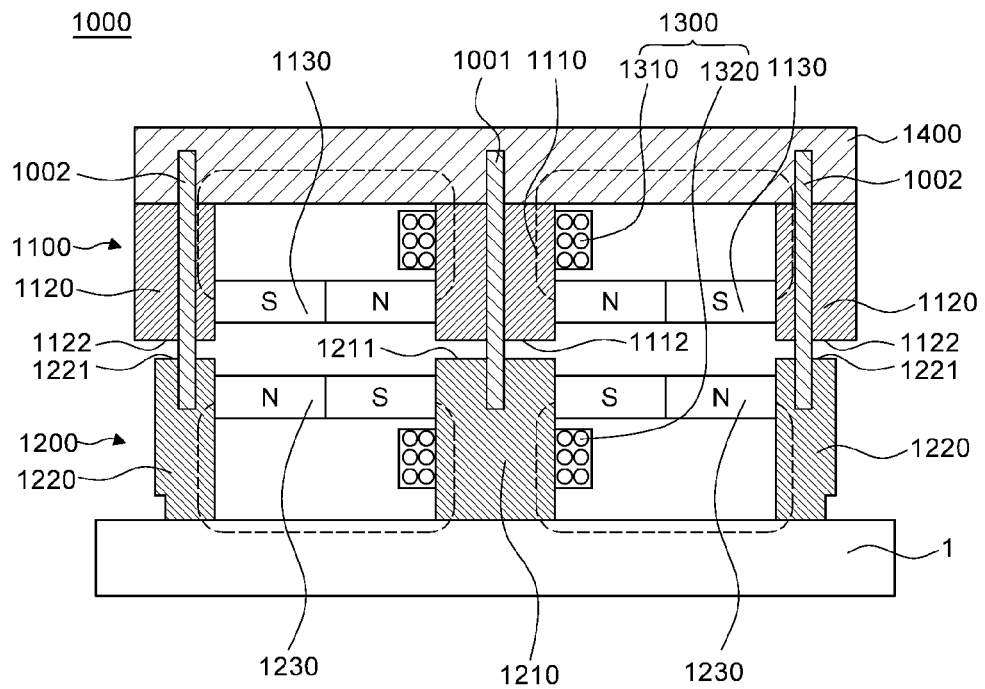

[fig. 1E]
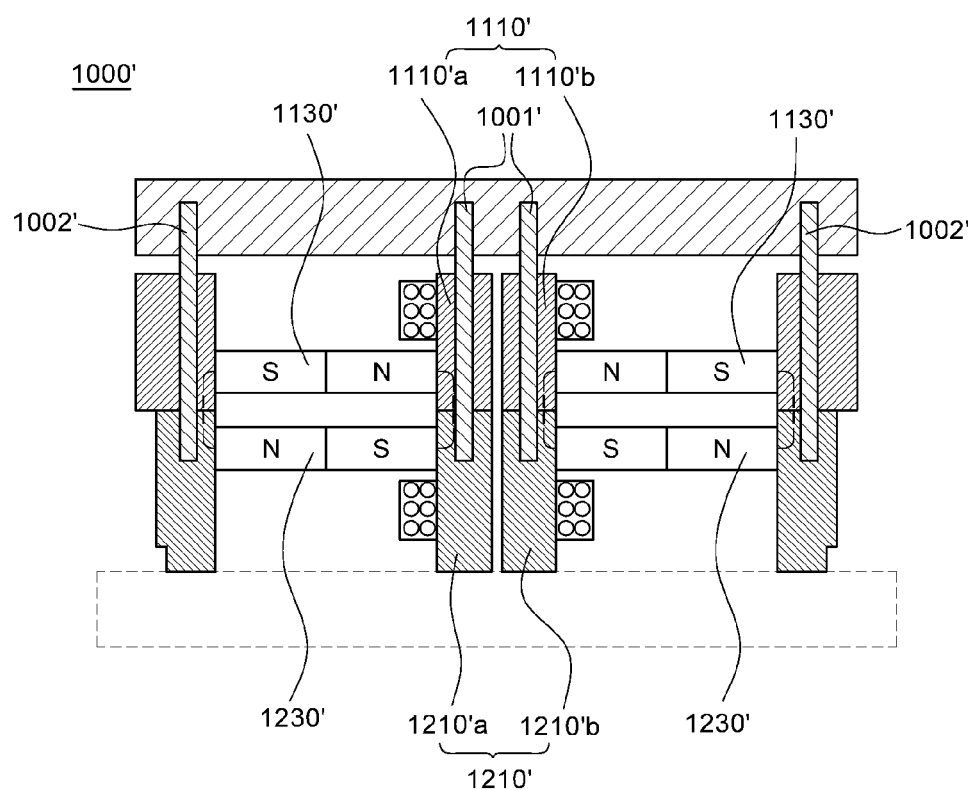

[fig. 1F]
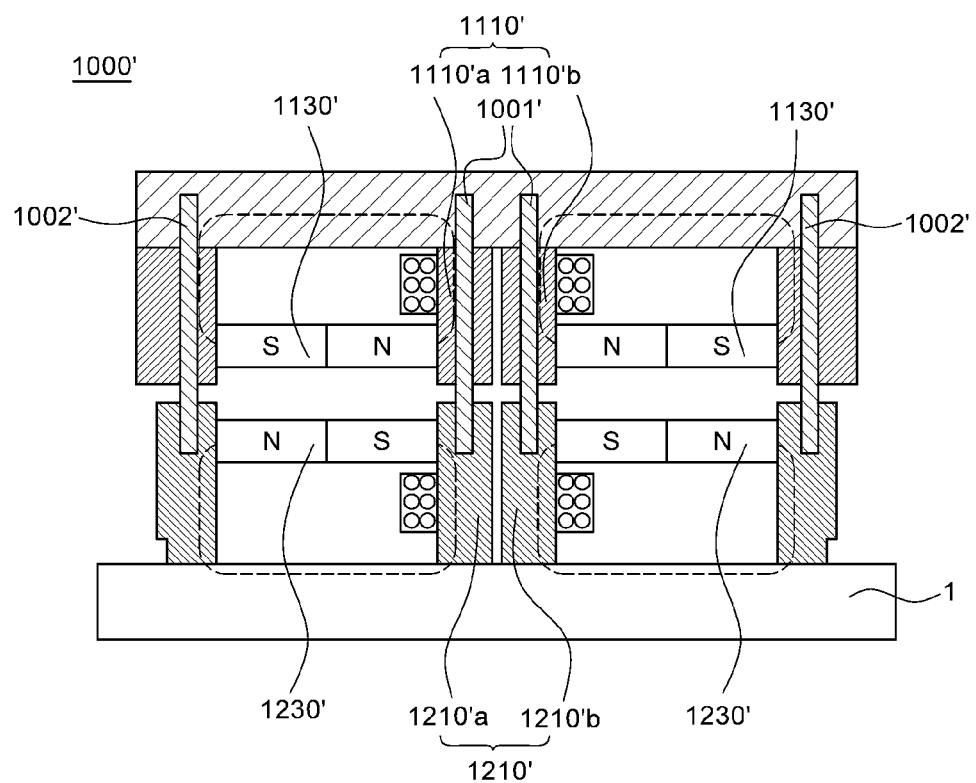

[fig. 2]
(a)
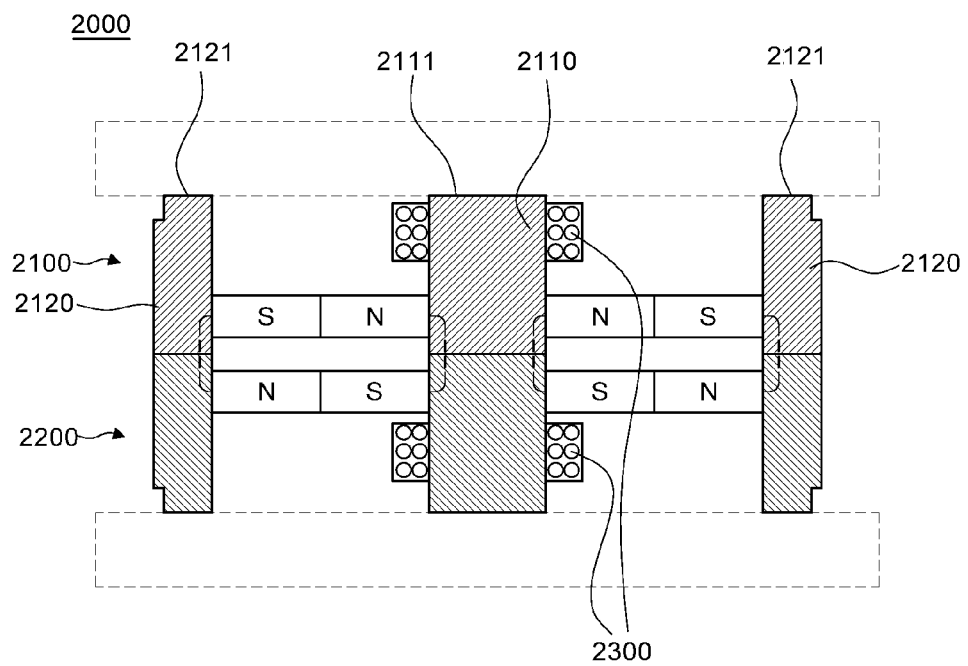
(b)
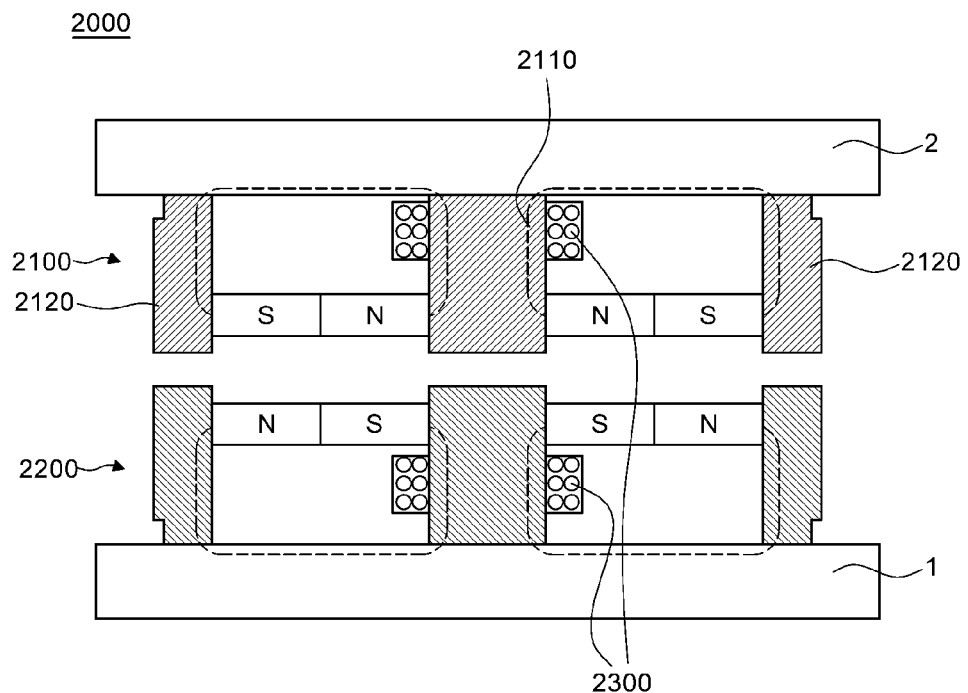

[fig. 3A]
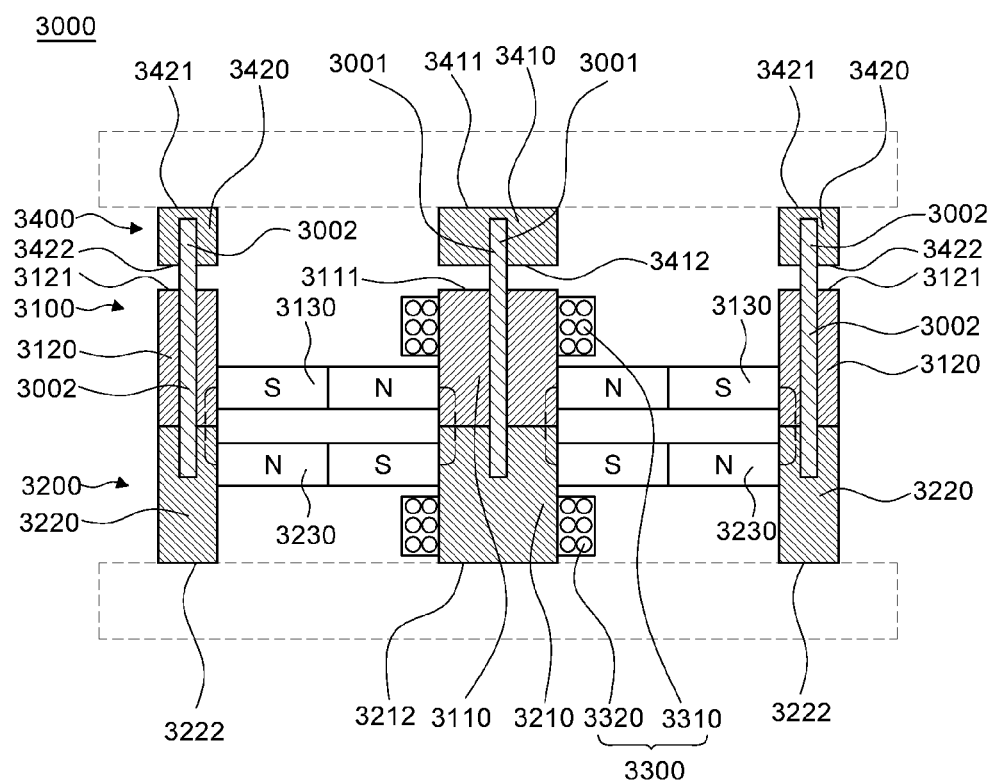

【fig. 3B】
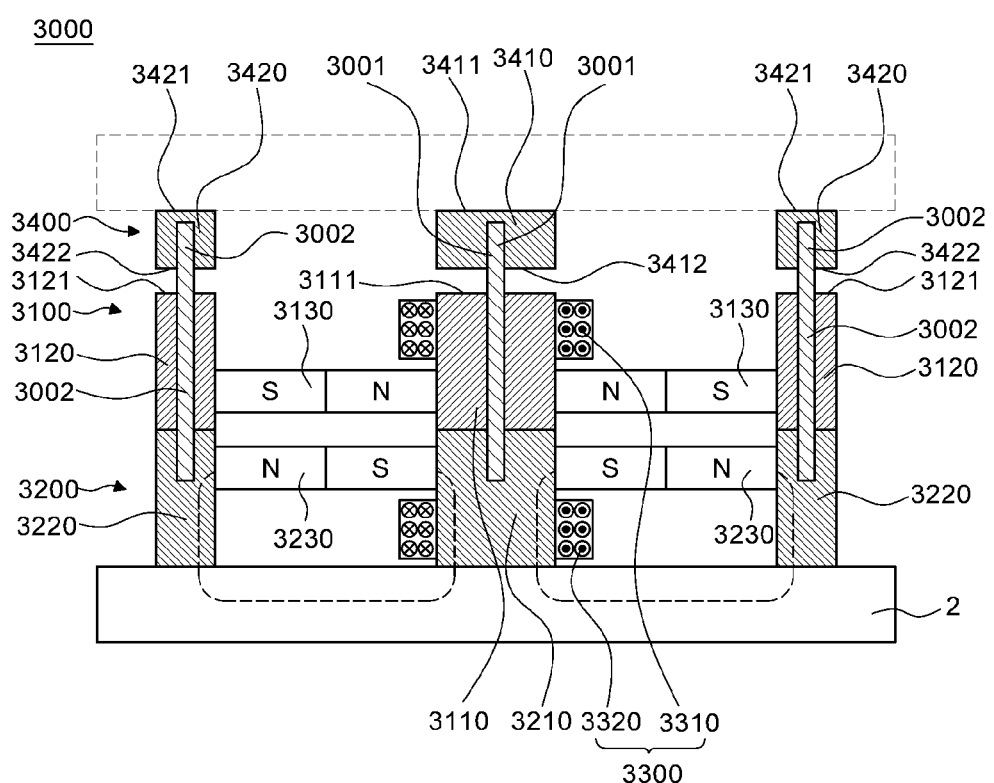

[fig. 3C]
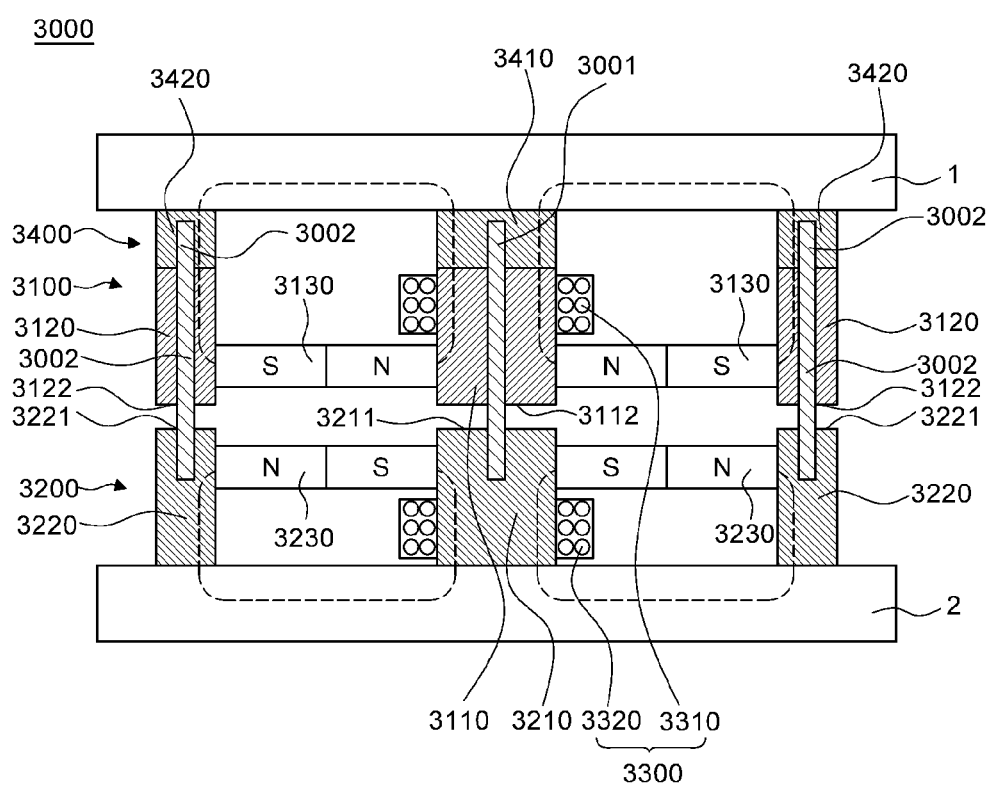

[fig. 4B]
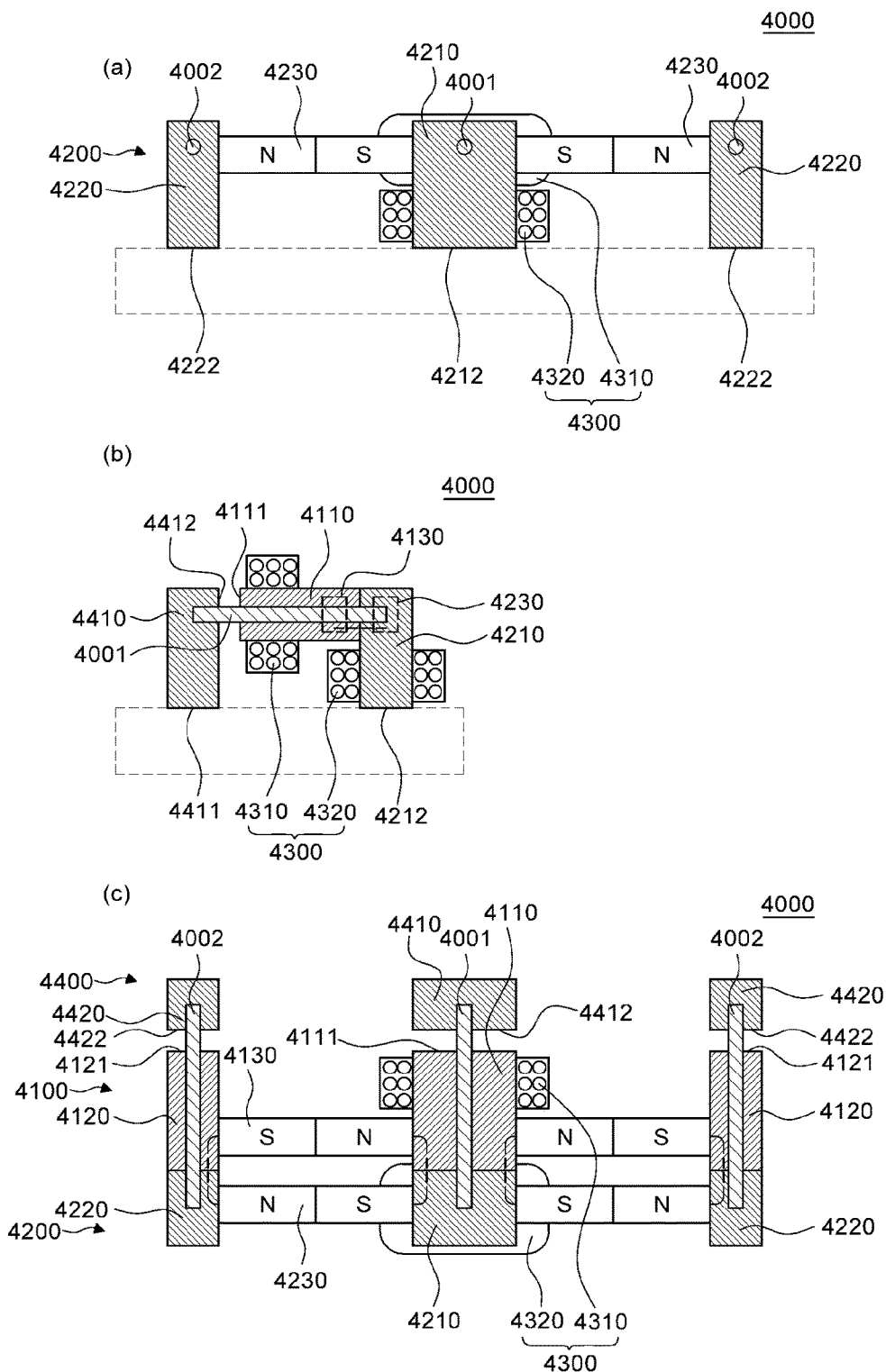

[fig. 4C]
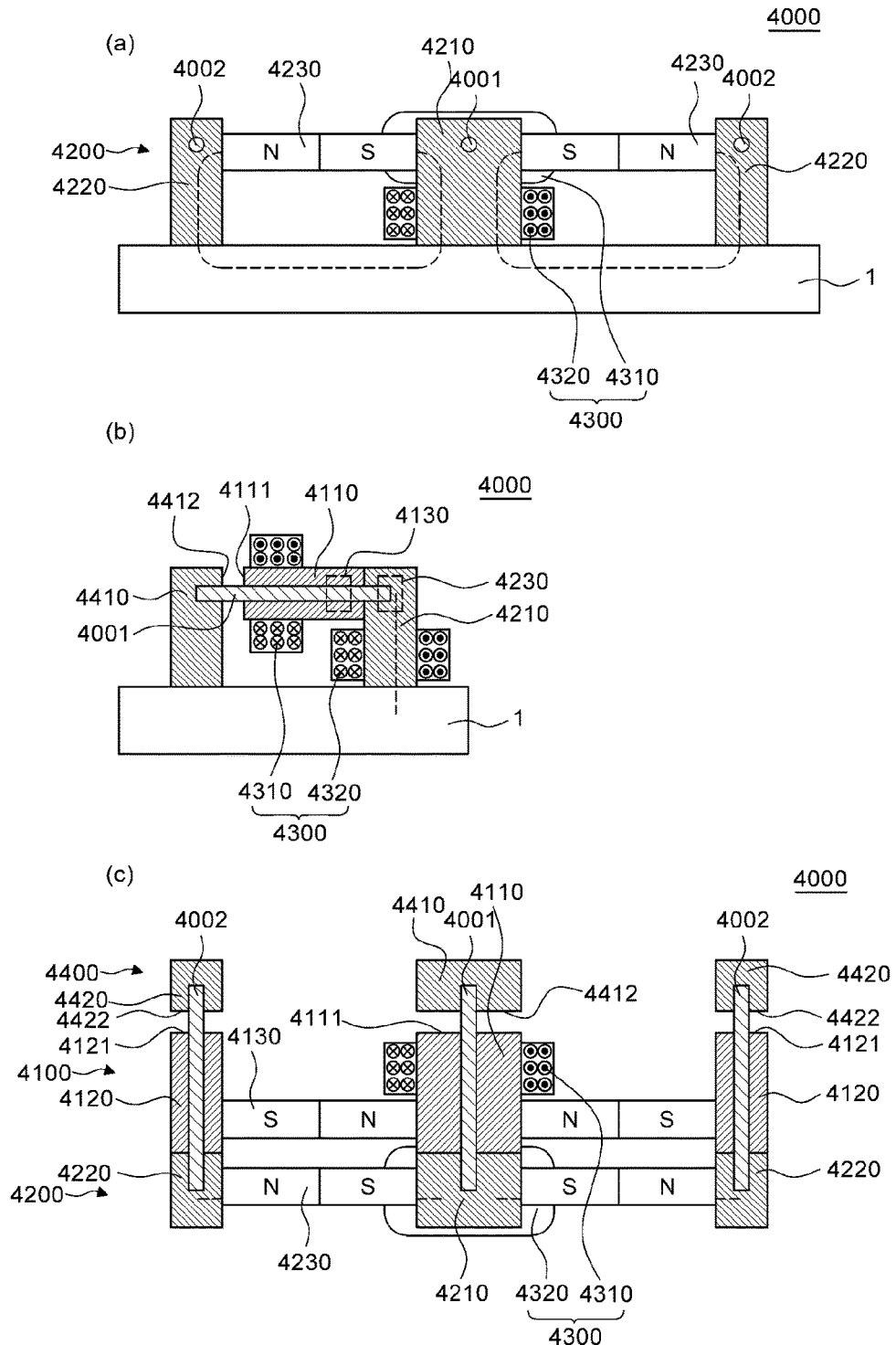

【fig. 4D】
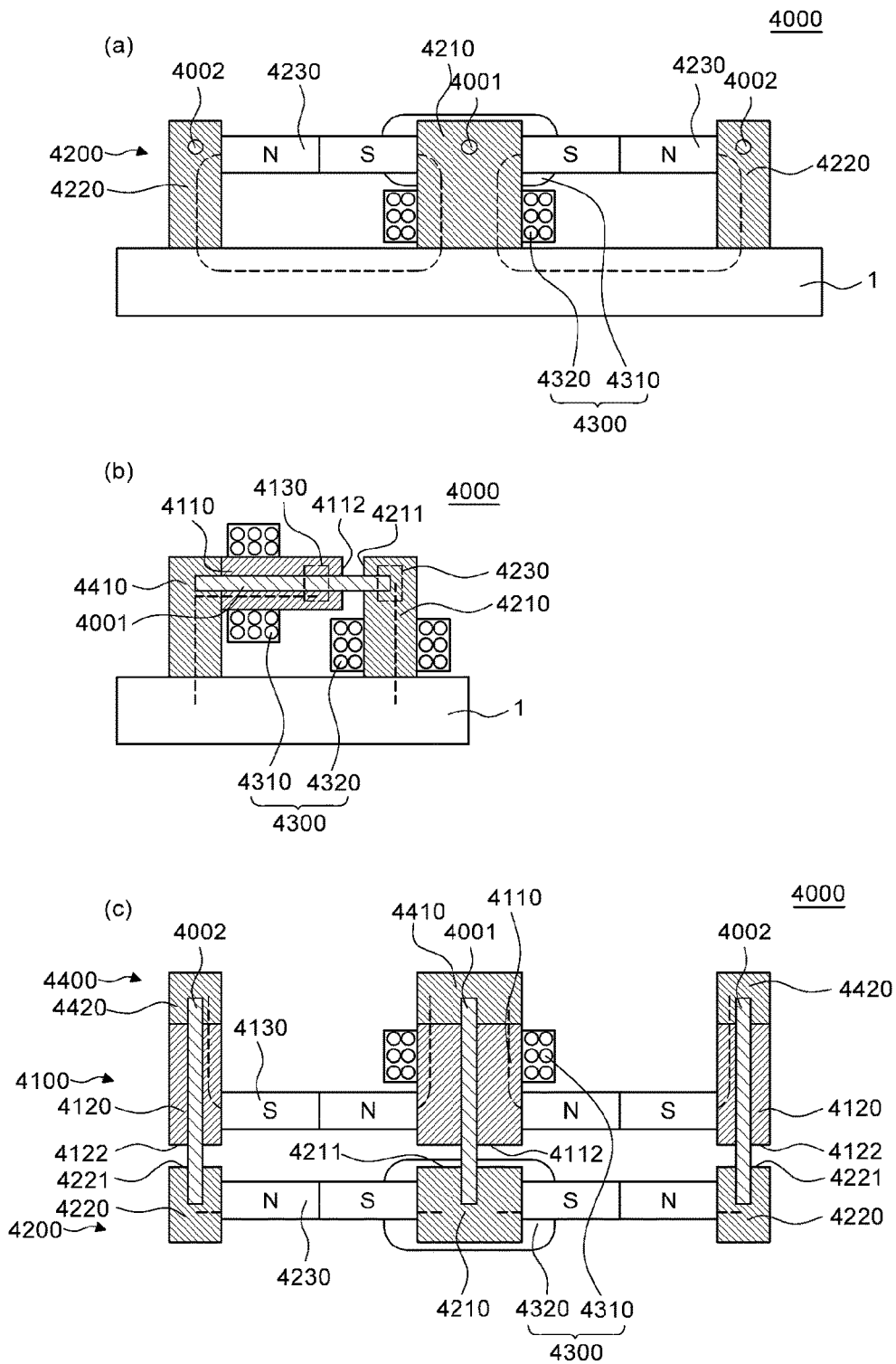

[fig. 5A]
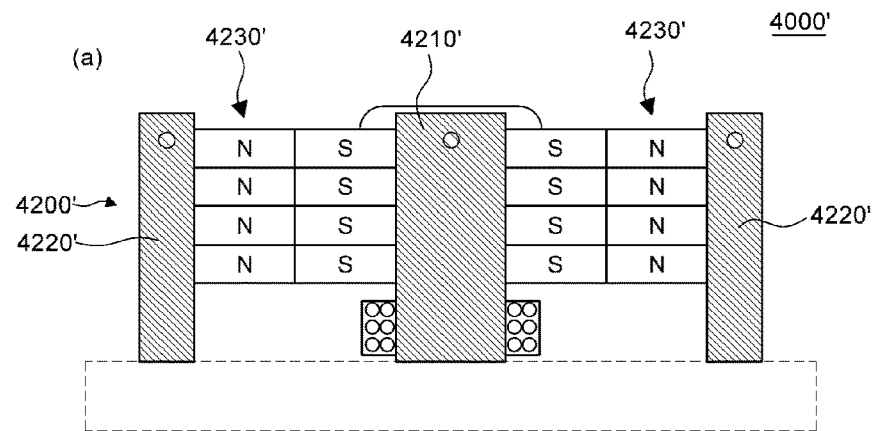
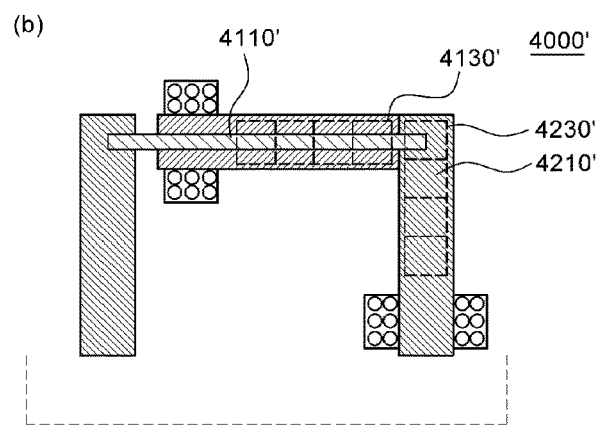
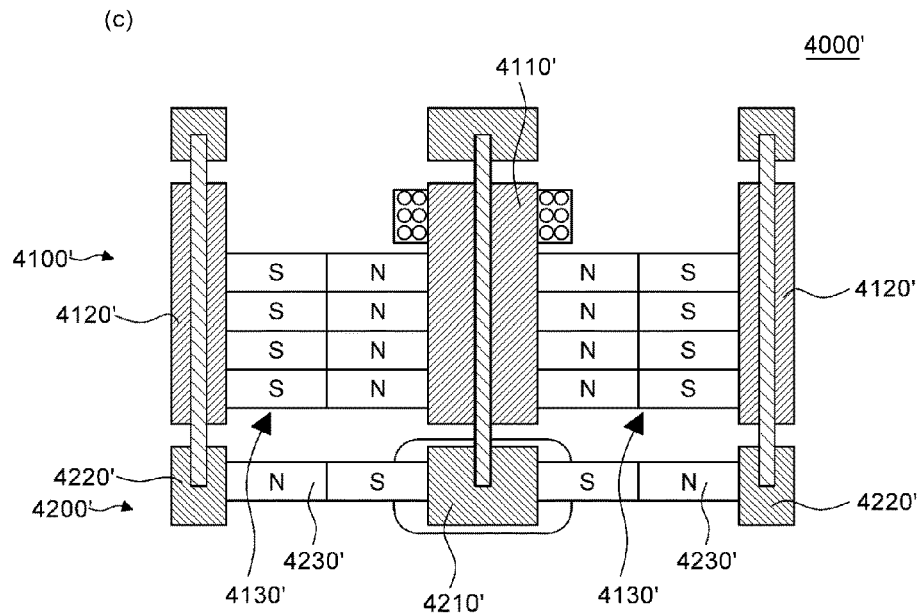

【fig. 5B】
(a)
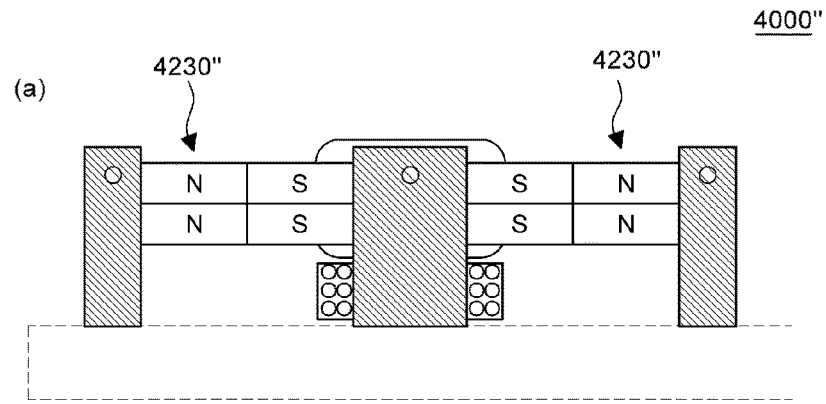
(b)
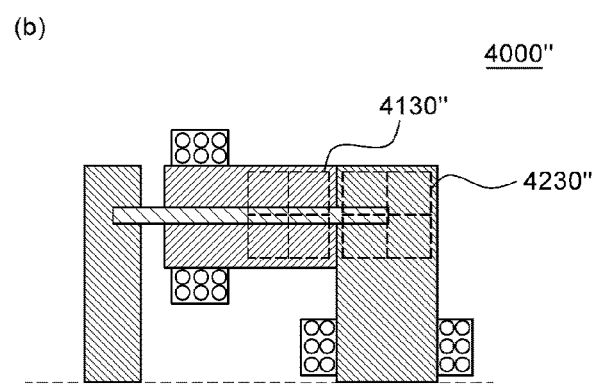
(c)
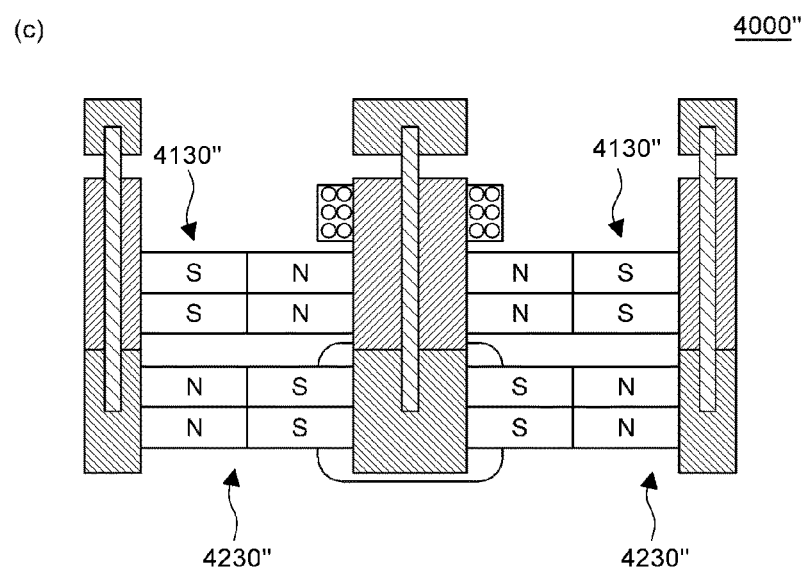

MAGNETIC SUBSTANCE HOLDING DEVICE

CROSS-REFERENCE TO RELATED APPLICATIONS

This application claims the priority of Korean Patent Application No. 10-2015-0010094 filed on Jan. 21, 2015, in the Korean Intellectual Property Office, the disclosure of which is incorporated herein by reference.

BACKGROUND OF THE INVENTION

Field of the Invention

The present invention relates to a magnetic substance holding device, and more particularly to a magnetic substance holding device that controls magnetic fluxes from permanent magnets to thereby obtain strong holding force, to easily switch between holding and detaching, and to minimize residual magnetism.

Description of the Related Art

A magnetic substance holding device such as a permanent magnet workholding device is used to attach thereto a workpiece made of a magnetic material such as iron using magnetic force. Nowadays, such a magnetic substance holding device is widely used as an internal device attached to a mold clamping unit of an injection molding machine, a mold clamping unit of a press machine, a chuck of a machine tool, and so on.

The basic principle of such a magnetic substance holding device is that it attaches a magnetic workpiece to a holding face using strong magnetic force from a permanent magnet, and detaches the magnetic workpiece from the holding face by controlling the magnetic flux from the permanent magnet so that no magnetic flux flows through the holding face.

The method for controlling the magnetic flux from the permanent magnet may include rotating another permanent magnet which is rotatably installed to control the magnetic flux, employing an additional electromagnet to control the magnet flux, or the like.

The applicant of the present invention has already proposed a magnetic substance holding device employing an additional electromagnet (see Korean Patent No. 1319052, titled "MAGNETIC SUBSTANCE HOLDING DEVICE USING PERMANENT MAGNET ENERGY CONTROL," published on Oct. 17, 2013). In addition, the applicant of the present invention has proposed an improved magnetic substance holding device (see Korean Patent Laid-open Publication No. 10-2014-0124739, titled "MAGNETIC SUBSTANCE HOLDING DEVICE," published on Oct. 27, 2014).

The magnetic substance holding device disclosed in the Korean Patent No. 1319052 to the applicant of the present invention includes coils around pole pieces instead of an additional electromagnet, and accordingly has advantages in that strong holding force can be obtained in a simple structure, magnetic force from a permanent magnet can be controlled with small electric current at the time of switching between holding and detaching, and strong holding force can be obtained in a smaller space.

However, there is still a challenge for such a magnet substance holding device to minimize residual magnetism that attracts a workpiece even after it is detached.

In short, as more permanent magnets are used for increasing holding force, it becomes more difficult to control magnetic fluxes and residual magnetism becomes lager, thereby harming the usability.

SUMMARY OF THE INVENTION

In view of the above, an object of the present invention is to provide a magnetic substance holding device that controls magnetic fluxes from permanent magnets to thereby obtain strong holding force, to easily switch between holding and detaching, and to minimize residual magnetism.

It should be noted that objects of the present invention are not limited to the above-mentioned object; and other objects of the present invention will be apparent to those skilled in the art from the following descriptions.

According to an aspect of the present invention, there is provided a magnetic substance holding device for holding and detaching a workpiece that is a magnetic substance, the device comprising: a first pole piece assembly comprising at least one first pole piece having a first face and a second face, the first pole piece being a magnetic substance, at least two second pole pieces, each of the second pole pieces having a first face and a second face and being a magnetic substance, and at least two first permanent magnets, one of an N-pole and an S-pole of each of the first permanent magnets being in contact with the first pole piece while the other of the N-pole and the S-pole thereof being in contact with the second pole pieces, respectively; a second pole piece assembly comprising at least one third pole piece having a first face and a second face, the third pole piece being a magnetic substance, at least two fourth pole pieces, each of the fourth pole pieces having a first face and a second face and being a magnetic substance, and at least two second permanent magnets, their each pole of opposite polarity to that of the poles of the first permanent magnets in contact with the first pole piece is in contact with the third pole piece while the pole of same polarity to that of the poles of the first permanent magnets in contact with the first pole piece is in contact with the fourth pole pieces, respectively; wherein the first face of the third pole piece faces the second face of the first pole piece while the first face of each of the fourth pole pieces faces the second face of a respective one of the second pole pieces; at least one coil wound around the first pole piece and/or the third pole piece; and a control device controlling electric current applied to the coil, wherein the first pole piece assembly and/or the second pole piece assembly is configured to be movable such that they are switched between a first arrangement in which the second faces of the first pole piece assembly are spaced apart from the first faces of the second pole piece assembly, and a second arrangement in which the second faces of the first pole piece assembly come in contact with the first faces of the second pole piece assembly, and wherein the control device controls holding and detaching of a workpiece on and from the first faces of the first pole piece assembly or the second faces of the second pole piece assembly, by way of controlling electric current applied to the coil to switch between the first arrangement and the second arrangement.

The device may further comprise: a base having a contact face and being a magnetic substance, the contact face facing the first faces of the first pole piece assembly. The first faces of the first pole piece assembly come in contact with the contact face of the base when the first pole piece assembly and the second pole piece assembly are in the first arrangement, and the first faces of the first pole piece assembly are spaced apart from the contact face of the base when the first pole piece assembly and the second pole piece assembly are in the second arrangement.

The device may further comprise: a base having a contact face and being a magnetic substance, wherein the base is disposed such that its contact face is in contact with the first faces of the first pole piece assembly.

According to an aspect of the present invention, there is provided a magnetic substance holding device for holding and detaching a workpiece that is a magnetic substance, the device comprising: a first pole piece assembly comprising at least one first pole piece having a first face and a second face, the first pole piece being a magnetic substance, at least two second pole pieces, each of the second pole pieces having a first face and a second face and being a magnetic substance, and at least two first permanent magnets, one of an N-pole and an S-pole of each of the first permanent magnets being in contact with the first pole piece while the other of the N-pole and the S-pole thereof being in contact with the second pole pieces, respectively; a second pole piece assembly comprising at least one third pole piece having a first face and a second face, the third pole piece being a magnetic substance, at least two fourth pole pieces, each of the fourth pole pieces having a first face and a second face and being a magnetic substance, and at least two second permanent magnets, their each one pole of opposite polarity to that of the poles of the first permanent magnets in contact with the first pole piece is in contact with the third pole piece while the pole of same polarity to that of the poles of the first permanent magnets in contact with the first pole piece is in contact with a respective one of the fourth pole pieces; wherein the first face of the third pole piece faces the second face of the first pole piece while the first face of each of the fourth pole pieces faces the second face of a respective one of the second pole pieces; a connection pole piece assembly comprising at least one first connection pole piece having a first face and a second face and being a magnetic substance, and at least two second connection pole pieces, each of the second connection pole pieces having a first face and a second face and being a magnetic substance; wherein the second face of the first connection pole piece faces the first face of the first pole pieces, and the second face of each of the second connection pole pieces faces the first face of the respective one of the second pole pieces; at least one coil wound around the first pole piece and/or the third pole piece; and a control device controlling electric current applied to the coil, wherein at least one least one of the first pole piece assembly, the second pole piece assembly and the connection pole piece assembly is configured to be movable such that they are switched between a first arrangement in which the second faces of the first pole piece assembly are spaced apart from the first faces of the second pole piece assembly while the first faces of the first pole piece assembly come in contact with the second faces of the connection pole piece assembly, and a second arrangement in which the second faces of the first pole piece assembly come in contact with the first faces of the second pole piece assembly while the first faces of the first pole piece assembly are spaced apart from the second faces of the connection pole piece assembly, and wherein the control device controls holding and detaching of a workpiece on and from the first faces of the connection pole piece assembly or the second faces of the second pole piece assembly, by way of controlling electric current applied to the coil to switch between the first arrangement and the second arrangement.

The first faces of the connection pole piece assembly and the second faces of the second pole piece assembly may be configured to hold and detach a single workpiece.

The first pole piece assembly may be movable along a plane extended from the second faces of the second pole piece assembly and the first faces of the connection pole piece assembly.

At least two first permanent magnets may be disposed between the first pole piece and each of the second pole pieces, and at least two second permanent magnets may be disposed between the third pole piece and each of the fourth pole pieces.

The first permanent magnets may be disposed in a line between the first pole piece and each of the second pole pieces, and the second permanent magnets may be disposed in a line between the third pole piece and each of the fourth pole pieces.

The first pole piece assembly may comprise at least two first pole pieces, the second pole piece assembly may comprise at least two third pole pieces, at least one first permanent magnet may be disposed between each of the first pole piece and a respective one of the second pole pieces, and at least one second permanent magnet may be disposed between each of the third pole piece and a respective one of the fourth pole pieces.

An area of the first face of each of the fourth pole pieces may be smaller than an area of the second face of a respective one of the second pole pieces, and the area of the second face of each of the fourth pole pieces may be smaller than an area of the first face of a respective one of the fourth pole pieces.

The device may further comprise: a rail bolt fixed to the first pole piece assembly and to the base while penetrating the second pole piece assembly so that the second pole piece assembly slides along the rail bolt.

The device may further comprise: a rail bolt fixed to the first pole piece assembly and to the connection pole piece assembly while penetrating the second pole piece assembly so that the second pole piece assembly slides along the rail bolt.

According to the magnetic substance holding device of the present invention, residual magnetism when a workpiece has been detached therefrom can be minimized. In addition, by disposing coils around pole pieces instead of an additional electromagnet, strong holding force can be obtained in a simple structure, magnetic force from a permanent magnet can be controlled with small electric current at the time of switching between holding and detaching, and strong holding force can be obtained in a smaller space.

BRIEF DESCRIPTION OF THE DRAWINGS

The above and other aspects, features and other advantages of the present invention will be more clearly understood from the following detailed description taken in conjunction with the accompanying drawings, in which:

FIGS. 1A to 1F are schematic cross-sectional views of a magnetic substance holding device according to an exemplary embodiment of the present invention;

FIG. 2 is a schematic cross-sectional view of a magnetic substance holding device according to another exemplary embodiment of the present invention;

FIGS. 3A to 3C are schematic cross-sectional views of a magnetic substance holding device according to yet another exemplary embodiment of the present invention;

FIGS. 4A to 4D are a schematic perspective view and side cross-sectional views of a magnetic substance holding device according to still another exemplary embodiment of the present invention; and FIGS. 5A and 5B are schematic, side cross-sectional views of a magnetic substance holding device according to variants of the magnetic substance holding device shown in FIGS. 4A to 4D.

DETAILED DESCRIPTION OF THE PREFERRED EMBODIMENT

Figure 4A:
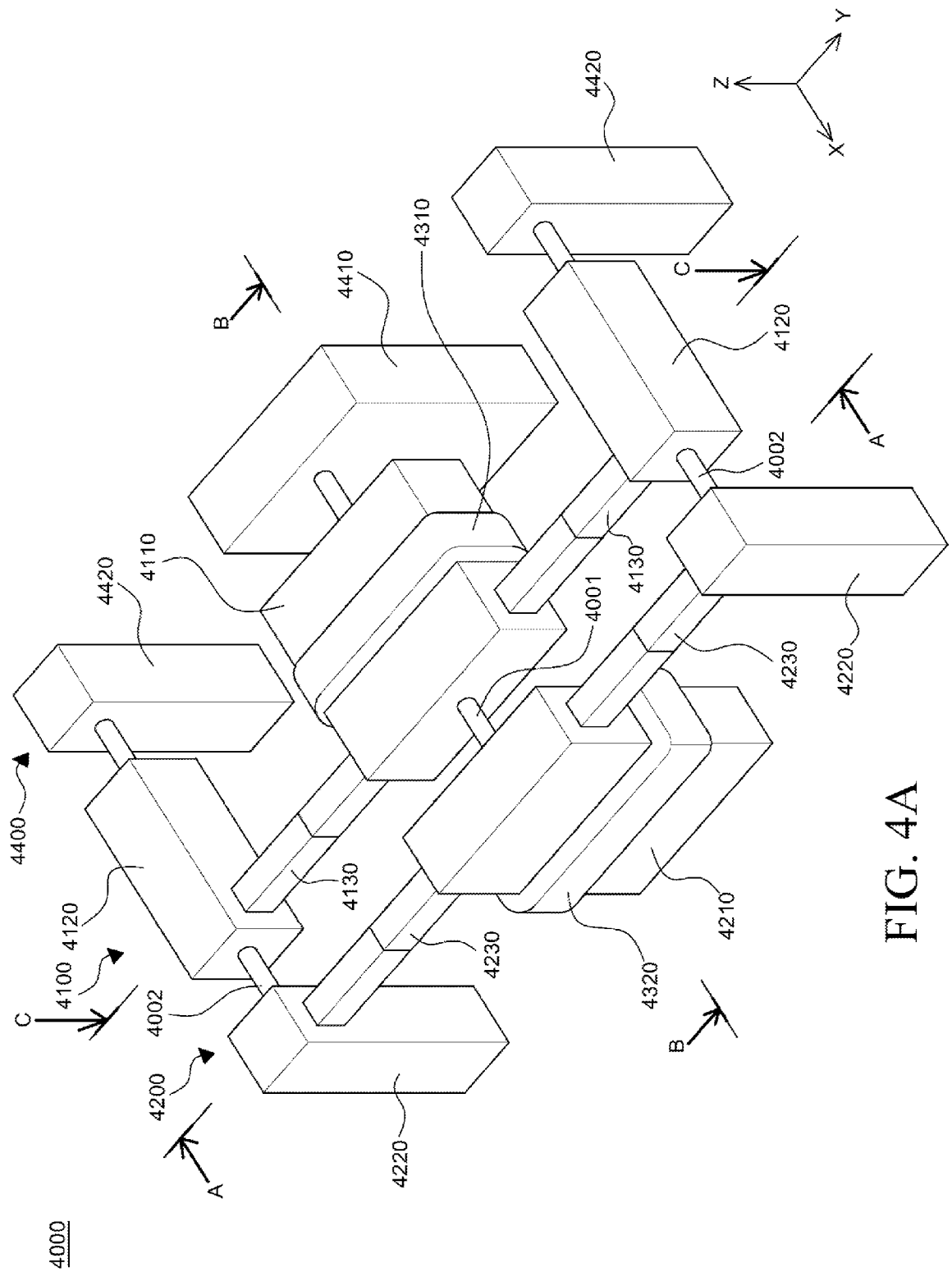

Advantages and features of the present invention and methods to achieve them will become apparent from the descriptions of exemplary embodiments herein below with reference to the accompanying drawings. However, the present invention is not limited to exemplary embodiments disclosed herein but may be implemented in various different ways. The exemplary embodiments are provided for making the disclosure of the present invention thorough and for fully conveying the scope of the present invention to those skilled in the art. It is to be noted that the scope of the present invention is defined only by the claims.

The figures, dimensions, ratios, angles, numbers of elements given in the drawings are merely illustrative and are not limiting. Further, in describing the present invention, descriptions on well-known technologies may be omitted in order not to obscure the gist of the present invention. It is to be noticed that the terms "comprising," "having," "including" and so on, used in the description and claims, should not be interpreted as being restricted to the means listed thereafter unless specifically stated otherwise. Where an indefinite or definite article is used when referring to a singular noun, e.g. "a," "an," "the," this includes a plural of that noun unless specifically stated otherwise.

In describing elements, they are interpreted as including error margins even without explicit statements.

In describing positional relationship, such as "an element A on an element B," "an element A above an element B," "an element A below an element B" and "an element A next to an element B," another element C may be disposed between the elements A and B unless the term "directly" or "immediately" is explicitly used.

As used herein, a phrase "an element A on an element B" refers to that the element A may be disposed directly on the element B and/or the element A may be disposed indirectly on the element B via another element C. Like reference numerals denote like elements throughout the descriptions.

Although terms such as first, second, etc. are used to distinguish arbitrarily between the elements such terms describe and these terms are not necessarily intended to indicate temporal or other prioritization of such elements. Theses terms are used to merely distinguish one element from another. Accordingly, as used herein, a first element may be a second element within the technical scope of the present invention.

The drawings are not to scale and the relative dimensions of various elements in the drawings are depicted schematically and not necessarily to scale.

Features of various exemplary embodiments of the present invention may be combined partially or totally. As will be clearly appreciated by those skilled in the art, technically various interactions and operations are possible. Various exemplary embodiments can be practiced individually or in combination.

Hereinafter, magnetic substance holding devices according to exemplary embodiments of the present invention will be described with reference to the accompanying drawings.

At first, the basic configuration and operating principle of a magnetic substance holding device of the present invention will be described.

FIGS. 1A to 1F are schematic cross-sectional views of a magnetic substance holding device according to an exemplary embodiment of the present invention. In particular, FIGS. 1E and 1F are schematic cross-sectional views of a magnetic substance holding device according to a variant of the magnetic substance holding device shown in FIGS. 1A to 1D.

Referring to FIGS. 1A to 1D, the magnetic substance holding device 1000 includes a first pole piece assembly 1100, a second pole piece assembly 1200, coils 1300, a base 1400, and a control device (not shown).

The first pole piece assembly 1100 includes at least one first pole piece 1110, at least two second pole pieces 1120, and at least two first permanent magnets 1130. The first pole piece 1110 is a magnetic substance and has a first face 1111 and a second face 1112. Further, each of the second pole pieces 1120 is a magnetic substance and has a first face 1121 and a second face 1122. The N-pole or the S-pole of each of the first permanent magnets 1130 is in contact with the first piece 1110 while the S-pole or the N-pole thereof is in contact with the respective second pole pieces 1120. For example, as shown in FIGS. 1A to 1D, the N-pole of each of the first permanent magnets 1130 may be in contact with the first pole piece 1110 while the S-pole thereof may be in contact with the respective second pole pieces 1120. The poles of the first permanent magnets 1130 may be disposed in the opposite direction.

The second pole piece assembly 1200 includes at least one third pole piece 1210, at least two fourth pole pieces 1220, and at least two second permanent magnets 1230. The third pole piece 1210 is a magnetic substance and has a first face 1211 and a second face 1212. Further, each of the fourth pole pieces 1220 is a magnetic substance and has a first face 1221 and a second face 1222. Between the N-pole and the S-pole of each of the second permanent magnets 1130, the pole of opposite polarity to that of the poles of the first permanent magnets in contact with the first pole piece 1110 is in contact with the third pole piece 1210 while the other pole is in contact with a respective one of the fourth pole pieces 1120.

The first pole piece assembly 1100 and the second pole piece assembly 1200 are arranged so that the first face 1211 of the third pole piece 1210 can come in contact with and be spaced apart from the second face 1112 of the first pole piece 1110 (i.e., they face each other) while the first face 1221 of each of the fourth pole pieces 1220 can come in contact with and be spaced apart from the second face 1122 of a respective one of the second pole pieces 1120 (i.e., they face each other).

The coils 1300 may be wound around the first pole piece 1110 and/or the third pole piece 1210. Coils 1310 and 1320 may be wound around the first pole piece 1110 and the third pole piece 1210, respectively, as shown in FIGS. 1A to 1D, or may be wound around only the first pole piece 1110 or only the third pole piece 1210, although not shown in the drawings.

The coils 1310 and 1320 are wound around magnetic substances and affect magnetic fluxes in the magnetic substances by magnetizing the magnetic substances upon application of electric current. The coils 1310 and 1320 are disposed so that they can affect a magnetic flux passing through the first face 1111 of the first pole piece 1110 and a magnetic flux passing through the second face 1212 of the third pole piece 1210, respectively. The coil 1310 may be disposed closer than the first permanent magnet 1130 to the first face 1111 of the first pole piece 1110 as shown in FIG. 1A to 1D, or may be disposed more distant than the first permanent magnet 1130 from the first face 1111 of the first pole piece 1110. The coil 1320 may be disposed closer than the second permanent magnet 1230 to the second face 1212 of the third pole piece 1210 as shown in FIG. 1A to 1D, or may be disposed more distant than the second permanent magnet 1230 from the second face 1212 of the third pole piece 1210.

Although each of the coils 1310 and 1320 is wound around the first and third pole pieces, respectively, in FIGS. 1A to 1D, two or more coils may be wound around the first and third pole pieces, respectively.

In addition, it is beneficial to dispose the coils 1310 and 1320 between the second permanent magnets 1230 and the second faces 1212 and 1222 of the second pole piece assembly 1200 for the purpose of controlling magnetic flux. In addition, coils 1310 and 1320 may be disposed between the first permanent magnets 1130 and the first faces 1111 and 1121 of the first pole piece assembly 1100. Such disposal of the coils 1310 and 1320 may be applied to other exemplary embodiments.

The coils 1310 and 1320 are connected to the control device. The control device controls (the direction or intensity of) electric current applied to the coils 1310 and 1320. As used herein, electric current refers to direct current (DC).

The base 1400 has a contact face 1401 and is a magnetic substance. The base 1400 is disposed so that it can come in contact with and be spaced apart from the first faces 1111 and 1121 of the first pole piece assembly 1100 (i.e., they face each other). The contact face 1401 of the base 1400 may be in contact with the first faces 1111 and 1121 of the first pole piece assembly 1100 so that the base 1400 may move together with the first pole piece assembly 1100 or may be stationary.

At least one of the first pole piece assembly 1100, the second pole piece assembly 1200 and the base 1400 is movable, so that a first arrangement in which the second faces 1112 and 1122 of the first pole piece assembly 1100 are spaced apart from the first faces 1211 and 1221 of the second pole piece assembly 1200, respectively, while the first faces 1111 and 1121 of the first pole piece assembly 1100 come in contact with the contact face 1401 of the base 1400 (the arrangement shown in FIGS. 1C and 1D), and a second arrangement in which the second faces 1112 and 1122 of the first pole piece assembly 1100 come in contact with the first faces 1211 and 1221 of the second pole piece assembly 1200, respectively, while the first faces 1111 and 1121 of the first pole piece assembly 1100 are spaced apart from the contact face 1401 of the base 1400 (the arrangement shown in FIGS. 1A and 1B) are switched between each other. Specifically, only the first pole piece 1100 or only the second pole piece 1200 may be movable, or both of the first and second pole pieces 1100 and 1200 may be movable. In the following descriptions, only the first pole piece assembly 1100 is movable in exemplary embodiments for the sake of convenience in description. However, it is to be understood that the present invention is not limited thereto.

Referring to FIGS. 1A to 1D, rail bolts 1001 and 1002 are fixed to the first pole piece assembly 1100 and to the base 1400 and penetrate the second pole piece assembly 1200, so that the second pole piece assembly 1200 slides along the rail bolts 1001 and 1002 by magnetic force. Namely, the first pole piece 1110 may slide along the rail bolt 1001 in the axial direction, as the rail bolt 1001 is fixed to the base 1400 and to the third pole piece 1210 while passing through the first pole piece 1110. Further, the second pole pieces 1120 may slide along the rail bolts 1002, as the rail bolts 1002 fixed to the base 1400 and to the fourth pole pieces 1220 pass through the second pole pieces 1120. The rail bolts 1001 and 1002 are non-magnetic substances and thus no magnetic flux may be created through the rail bolts 1001 and 1002. The rail bolts 1001 and 1002 may be fixed to the first pole piece assembly 1100 and to the base 1400 by screwing them thereinto. On the other hand, the rail bolts 1001 and 1002 may be fixed to at least one of the first pole piece assembly 1100, the second pole piece assembly 1200 and the base 1400, so that the others may slide along the rail bolts 1001 and 1002.

The control device adjusts (the direction or amplitude of) electric current applied to the coils 1310 and 1320 to thereby control the direction and the intensity of magnetic fluxes passing through the coils 1310 and 1320.

Referring to FIG. 1A, when the first pole piece assembly 1100 and the second pole piece assembly 1200 are in the second arrangement in which they are in contact with each other, with no electric current applied from the control device to the coils 1310 and 1320, a magnetic flux flows inside the magnetic circuit through the second faces 1112 and 1122 of the first pole piece assembly 1100 and the first faces 1211 and 1221 of the second pole piece assembly 1200, as indicated by the dashed lines. In this instance, almost no magnetic flux passes through the first faces 1111 and 1121 of the first pole piece assembly 1100 and the second faces 1212 and 1222 of the second pole piece assembly 1200. The magnetic fluxes passing through the first faces 1111 and 1121 of the first pole piece assembly 1100 and the second faces 1212 and 1222 of the second pole piece assembly 1200 are proportional to the difference in magnetic forces (magnetic energies) between the first permanent magnets 1130 and the second permanent magnets 1230. Therefore, in the arrangement shown in FIG. 1A, attractive forces between the first faces 1111 and 1121 of the first pole piece assembly 1100 and the base 1400 are minimized, and a workpiece, which is a magnetic substance, is not held on the second faces 1212 and 1222 of the second pole piece assembly 1200 (Throughout the drawings, a workpiece that is not held by the device is indicated by a dashed line).

On the other hand, when the control device applies electric current to the coils 1310 and 1320 as shown in FIG. 1B, the magnetic fluxes between the first permanent magnets 1130 and the second permanent magnets 1230 through the second faces 1112 and 1122 of the first pole piece assembly 1100 and the first faces 1211 and 1221 of the second pole piece assembly 1200 become weak and are eventually disconnected.

When this happens, the first pole piece assembly 1100 slides along the rail bolts 1001 and 1002 by magnetic force, so that the first faces 1111 and 1121 of the first pole piece assembly 1100 come in contact with the contact face 1401 of the base 1400, while the second faces 1212 and 1222 of the second pole piece assembly 1200 come in contact with a workpiece 1 which is a magnetic substance. As a result, magnetic fluxes passing through the base 1400 and the workpiece 1 are created as indicated by the dashed lines in FIG. 1C, so that the base 1400 is attached to the first faces 1111 and 1122 of the first pole piece assembly 1100 by stronger magnetic force, while the workpiece 1 is held on the second faces 1212 and 1222 of the second pole piece assembly 1200.

Thereafter, as shown in FIG. 1C, the magnetic fluxes once formed through the base 1400 and the workpiece 1 are not broken but remain even if electric current is no more applied to the coils 1310 and 1320. Further, since no magnetic flux is formed passing through the second faces 1112 and 1122 of the first pole piece assembly 1100 and the first faces 1211 and 1221 of the second pole piece assembly 1200, the first pole piece assembly 1100 and the second pole piece assembly 1200 can be spaced apart from each other.

Later on, as shown in FIG. 1D, by applying electric current to the coils 1310 and 1320 in the opposite direction to that shown in FIG. 1B, it is possible to detach the base 1400 and the workpiece 1 from the first pole piece assembly 1100 and the second pole piece assembly 1200 again. When electric current is applied to the coils 1310 and 1320 in the direction shown in FIG. 1D, the magnetic fluxes passing through the first faces 1111 and 1121 of the first pole piece assembly 1100 and the second faces 1211 and 1222 of the second pole piece assembly 1200 become weak and are eventually disconnected. Accordingly, the first pole piece assembly 1100 slides along the rail bolts 1001 and 1002 by magnetic force, so that the first pole piece assembly 1100 and the second pole piece assembly 1200 are switched to the second arrangement as shown in FIG. 1A, and the magnetic flux as shown in FIG. 1A can be restored.

In addition, the separation distance by which the base 1400 in the first arrangement is spaced apart from the first faces 1111 and 1121 of the first pole piece assembly 1100 also has to be determined appropriately. If the distance is too distant, the base 1400 may not be attached to the first faces 1111 and 1121 of the first pole piece assembly 1100 even when electric current is applied to the coils 1310 and 1320. On the other hand, if the distance is too close, the base 1400 may be attached to the first faces 1111 and 1121 of the first pole piece assembly 1100 even when electric current is not applied to the coils 1310 and 1320. Therefore, in view of the above, the separation distance between the base 1400 in the first arrangement and the first faces 1111 and 1121 has to be adjusted such that the base 1400 is attached to the first faces 1111 and 1121 of the first pole piece assembly 1100 only when certain amount of electric current is applied to the coils 1310 and 1320. The distance may be adjusted empirically or experimentally, taking into account the intensity of the magnetic force induced by the coils 1310 and 1320, or the like.

In short, the control device adjusts electric current applied to the coils 1310 and 1320 to thereby control the direction and intensity of the magnetic fluxes passing through the coils 1310 and 1320. By doing so, the first pole piece assembly 1100, the second pole piece assembly 1200 and the base 1400 can be switched between the first arrangement and the second arrangement, and the direction and intensity of the magnetic fluxes passing through the first faces 1111 and 1121 of the first pole piece assembly 1100 and the second faces 1212 and 1222 of the second pole piece assembly 1200 can be controlled. As a result, the workpiece 1, which is a magnetic substance, can be held on and detached from the second faces 1212 and 1222 of the second pole piece assembly 1200.

Referring back to FIG. 1A, when the workpiece is detached from the magnetic substance holding device 1000 thus configured, the magnetic fluxes from the permanent magnets 1130 and 1230 flow only inside the magnetic circuit, so that it is possible to leave almost zero or completely no residual magnetism toward the outside. (This effect can be maximized when the first permanent magnets 1130 and the second permanent magnets 1230 have the equal magnetic force (magnetic energy).) Further, in this structure, permanent magnets can be placed closely together, and thus stronger holding force can be obtained.

Referring to FIGS. 1E and 1F, at least two first pole pieces 1110' and at least two third pole pieces 1210' can be disposed. In this instance, at least one first permanent magnets 1130' may be disposed between a first pole piece 1110'$a$ and the respective one of the second pole pieces 1120' while at least one first permanent magnet 1130' may be disposed between a first pole piece 1110'$b$ and the respective one of the second pole pieces 1120'. Further, at least one second permanent magnets 1230' may be disposed between a third pole piece 1210'$a$ and the respective one of the fourth pole pieces 1220' while at least one first permanent magnet 1230' may be disposed between a third pole piece 1210'$b$ and the respective one of the fourth pole pieces 1220'. With this configuration, magnetic fluxes in each of the first pole pieces 1110'$a$ and 1110'$b$ and each of the third pole pieces 1210'$a$ and 1210'$b$ are not superposed on one another. Namely, magnetic fluxes each created from the first permanent magnets 1130' or the second permanent magnets 1230' may be formed so that they are not superposed on one another in any of the pole pieces 1110'$a$, 1110'$b$, 1210'$a$ and 1210'$b$. Further, each of the rail bolts 1001' penetrates a respective one of the first pole pieces 1110' and is fixed to a respective one of the third pole pieces 1210', thereby guiding the movement of the first pole piece assembly 1100'.

The first pole pieces 1110'$a$ and 1110'$b$ may be spaced apart from each other, and the third pole pieces 1210'$a$ and 1210'$b$ may be spaced apart from each other, as shown in FIGS. 1E and 1F. However, they may be in contact with each other.

Further, the magnetic substance holding device 1000 according to this exemplary embodiment may further include means for further reducing residual magnetism. The means for further reducing residual magnetism will be described in detail below.

When the first pole piece assembly 1100 and the second pole piece assembly 1200 are in the second arrangement as shown in FIG. 1A, residual magnetism is created in a such manner that a part of the magnetic flux flowing in the magnetic circuits (indicated by the dashed lines) comes out of the circuits to affect the workpiece 1. Therefore, in order to eliminate residual magnetism, it is necessary to enhance the magnetic circuits as shown in FIG. 1A while making it difficult for magnetic fluxes to come out of the circuit.

Referring to FIGS. 1A to 1D, the area of the first faces of the four pole pieces 1220 may be smaller than the area of the second faces 1122 of the second pole pieces 1120, and the area of the second faces 1222 of the fourth pole pieces 1220 may be smaller than the first faces 1221 of the fourth pole pieces 1220. In other words, the thickness of the second pole pieces 1120 close to the second faces 1122 may be larger than the thickness of the four pole pieces 1220 close to the first faces 1221, and the thickness of the fourth pole pieces 1220 close to the second face 1222 may be smaller than the thickness of the four pole pieces 1220 close to the first faces 1221. With this configuration, the magnetic flux from the second permanent magnet 1230 is facilitated more toward the first faces 1211 and 1221 of the second pole piece assembly 1200 than toward the second faces 1212 and 1222.

Namely, it is possible to eliminate residual magnetism by way of making it difficult to form magnetic fluxes toward the second faces 1212 and 1222 of the second pole piece assembly 1200. It is to be understood that such features can be applied to other exemplary embodiments.

On the other hand, it is desirable to shape inner faces of the third pole piece 1210 and the fourth pole pieces 1220 to be straight, to facilitate magnetic fluxes between the second permanent magnets 1230 and the workpiece 1 so that attaching force can be enhanced.

Hereinafter, various exemplary embodiments of the present invention which are modifications of the structure shown in FIGS. 1A to 1D will be described.

FIG. 2 is a schematic cross-sectional view of a magnetic substance holding device according to another exemplary embodiment of the present invention.

Referring to FIG. 2, the magnetic substance holding device 2000 includes a first pole piece assembly 2100, a second pole piece assembly 2200, coils 2300, and a control device (not shown).

The first pole piece assembly 2100, the second pole piece assembly 2200 and the coils 2300 are identical to the first pole piece assembly 1100, the second pole piece assembly 1200 and the coils 1300 shown in FIGS. 1A to 1D; and, therefore, the redundant descriptions will be omitted. The magnetic substance holding device 2000 according to this exemplary embodiment is different from the magnetic substance holding device 1000 shown in FIGS. 1A to 1D in that the base 1400 has been eliminated and that a workpiece 2 can also be held on and detached from the first faces 2111 and 2121 of the first pole piece assembly 2100.

The first pole piece assembly 2100 and the second pole piece assembly 2200 is movable so that they can be switched between the first arrangement in which they are spaced apart from each other and the second arrangement in which they come in contact with each other. The first pole piece assembly 2100 and the second pole piece assembly 2200 may move in various manners known in the art, such as by using bolts and counter-bores. When the first pole piece assembly 2100 and the second pole piece assembly 2200 are in the first arrangement, the workpieces 1 and 2 are detached from the device. When the first pole piece assembly 2100 and the second pole piece assembly 2200 are in the second arrangement, the workpieces 1 and 2 are held on two sides of the device.

FIGS. 3A to 3C are schematic cross-sectional views of a magnetic substance holding device according to yet another exemplary embodiment of the present invention.

Referring to FIGS. 3A to 3C, the magnetic substance holding device 3000 includes a first pole piece assembly 3100, a second pole piece assembly 3200, coils 3300, a connection pole piece assembly 3400, and a control device (not shown).

The first pole piece assembly 3100, the second pole piece assembly 3200 and the coils 3300 are identical to the first pole piece assembly 1100, the second pole piece assembly 1200 and the coils 1300 shown in FIGS. 1A to 1D; and, therefore, the redundant descriptions will be omitted.

The connection pole piece assembly 3400 includes at least one first connection pole piece 3410, and at least two second connection pole pieces 3420. The first connection pole piece 3410 is a magnetic substance and has a first face 3411 and a second face 3412. Further, each of the second connection pole pieces 3420 is a magnetic substance and has a first face 3421 and a second face 3422.

The connection pole piece assembly 3400 is arranged so that the second face 3412 of the first connection pole piece 3410 can come in contact with and be spaced apart from the first face 3111 of the first pole piece 3110 (i.e., they face each other) while the second face 3422 of each of the second connection pole pieces 3420 can come in contact with and be spaced apart from the first face 3121 of a respective one of the second pole pieces 3120 (i.e., they face each other).

At least one of the first pole piece assembly 3100, the second pole piece assembly 3200 and the connection pole piece assembly 3400 are movable so that the first faces 3111 and 3121 of the first pole piece assembly 3100 come in contact with the second faces 3412 and 3422 of the connection pole piece assembly 3400, respectively, for a first arrangement in which the first pole piece assembly 3100 is spaced apart from the second pole piece assembly 3200 (the arrangement shown in FIG. 3C), while the first faces 3111 and 3121 of the first pole piece assembly 3100 are spaced apart from the second faces 3412 and 3422 of the connection pole piece assembly 3400, respectively, for a second arrangement in which the first pole piece assembly 3100 comes in contact with the second pole piece assembly 3200 (the arrangement shown in FIGS. 3A and 3B).

Referring to FIGS. 3A to 3C, rail bolts 3001 and 3002 are fixed to the first pole piece assembly 3100 and the connection pole piece assembly 3400 and penetrate the second pole piece assembly 3200, so that the second pole piece assembly 3200 slides along the rail bolts 3001 and 3002 by magnetic force. Namely, the first pole piece 3110 may slide along the rail bolt 3001 in the axial direction, as the rail bolt 3001 is fixed to the connection pole piece assembly 3400 and to the third pole piece 3210 while penetrating the first pole piece 3110. Further, the second pole pieces 3120 may slide along the rail bolts 3002 in the axial direction, as the rail bolts 3002 are fixed to the connection pole piece assembly 3400 and to the fourth pole pieces 3220 while penetrating the second pole pieces 3120. On the other hand, the rail bolts 3001 and 3002 may be fixed to at least one of the first pole piece assembly 3100, the second pole piece assembly 3200 and the connection pole pieces assembly 3400, so that the others may slide along the rail bolts 3001 and 3002.

Referring to FIG. 3A, when the first pole piece assembly 3100 and the second pole piece assembly 3200 are in the second arrangement, with no current applied to the coils 3310 and 3320, a magnetic flux flows inside the magnetic circuit in the first pole piece assembly 3100 and the second pole piece assembly 3200 and does not pass through the first faces 3111 and 3121 of the first pole piece assembly 3100 and the second faces 3212 and 3222 of the second pole piece assembly 3200, and thus workpieces cannot be held on neither upper side nor lower side of the device.

Then, when electric current in the direction indicated in FIG. 3B is applied to the coils 3310 and 3320, the magnetic flux between the first pole piece assembly 3100 and the second pole piece assembly 3200 is disconnected, and a magnetic flux passing through the second faces 3212 and 3222 of the second pole piece assembly 3200 becomes strong, so that the workpiece 2 can be held on the side close to the second pole piece assembly 3200. On the contrary, since the first pole piece assembly 3100 is spaced apart from the connection pole piece assembly 3400, a magnetic flux passing through the first faces 3411 and 3421 of the connection pole piece assembly 3400 is almost zero, and thus a workpiece can hardly be held on the first faces 3411 and 3421 of the connection pole piece assembly 3400.

Thereafter, when the amplitude of the electric current applied to the coils 3310 and 3320 in the direction indicated in FIG. 3B rises above a predetermine value, the first pole piece assembly 3100 slides along the rail bolts 3001 and 3002 by magnetic force to be in contact with the connection pole piece assembly 3400. As a result, the first pole piece assembly 3100 and the second pole piece assembly 3200 are in the first arrangement. When the first pole piece assembly 3100 is in the first arrangement as shown in FIG. 3C, magnetic fluxes from the first permanent magnets 3130 pass through the workpiece 1, and thus the workpiece 1 can be held on the upper side as well.

Then, the magnetic fluxes once formed remain even if electric current is no more applied to the coils 3310 and 3320, as indicated by the dashed lines in FIG. 3C. Accordingly, the workpiece 1 is held on the first faces 3411 and 3421 of the connection pole piece assembly 3400 while the workpiece 2 is held on the second faces 3212 and 3222 of the second pole piece assembly 3200.

In order to detach the workpieces 1 and 2 from the first pole piece assembly 3100 and from the second pole piece assembly 3200, respectively, by applying electric current in the opposite direction to that of FIG. 3B to the coils 3310 and 3320 so that the first pole piece assembly 3100 slides along the rail bolts 3001 and 3002 by magnetic force, the first pole piece assembly 3100 and the second pole piece assembly 3200 are placed in the second arrangement as shown in FIG. 3A to thereby restore the magnetic flux shown in FIG. 3A.

The magnetic substance holding device 3000 according to this exemplary embodiment has an advantage in that it can hold workpieces 1 and 2 on both sides. In addition, at the time of detaching as shown in FIG. 3A, the connection pole piece assembly 3400 is spaced apart from the first pole piece assembly 2100, and a magnetic flux flows only inside the magnetic circuit in the first pole piece assembly 3100 and the second pole piece assembly 3200, leaving almost no residual magnetism.

In short, the control device adjusts electric current applied to the coils 3310 and 3320 to thereby control the direction and intensity of the magnetic fluxes passing through the coils 3310 and 3320. By doing so, the first pole piece assembly 3100, the second pole piece assembly 3200 and the connection pole piece assembly 3400 can be switched between the first arrangement and the second arrangement, and the direction and intensity of the magnetic fluxes passing through the first faces 3111 and 3121 of the first pole piece assembly 3100 and the second faces 3211 and 3221 of the second pole piece assembly 3200 can be controlled. As a result, the workpieces 1 and 2, which are magnetic substances, can be held on and detached from the second faces 3212 and 3222 of the second pole piece assembly 3200 and the first faces 3411 and 3421 of the connection pole piece assembly 3400.

Although not shown in the drawings, at least two first connection pole pieces 1410' may be disposed, like the first pole pieces 1110' or the third pole pieces 1210' shown in FIG. 2. By doing so, magnetic fluxes in the first connection pole pieces 1410' may not be superposed with each another. Namely, magnetic fluxes each created from the first permanent magnets 1130' or the second permanent magnets 1230' may be formed so that they are not superposed on one another in any of the first connection pole pieces 1410'. The first connection pole pieces 1410' may be spaced apart from each other or may be in contact with each other.

FIGS. 4A to 4D are a schematic perspective view and side cross-sectional views of a magnetic substance holding device according to another exemplary embodiment of the present invention; and FIGS. 5A and 5B are schematic, side cross-sectional views of a magnetic substance holding device according to variants of the magnetic substance holding device shown in FIGS. 4A to 4D. Specifically, FIG. 4A is a perspective view conceptually showing the magnetic substance holding device shown in FIGS. 4B to 4D and FIGS. 5A and 5B. FIGS. 4B(a), 4C(a), 4D(a), 5A(a) and 5B(a) are cross-sectional views taken along line A-A of FIG. 4A. FIGS. 4B(b), 4C(b), 4D(b), 5A(b) and 5B(b) are cross-sectional views taken along line B-B of FIG. 4A. FIGS. 4B(c), 4C(c), 4D(c), 5A(c) and 5B(c) are cross-sectional views taken along line C-C of FIG. 4A.

Referring to FIGS. 4A to 4D, the magnetic substance holding device 4000 according to this exemplary embodiment includes a first pole piece assembly 4100, a second pole piece assembly 4200, coils 4300, a connection pole piece assembly 4400, and a control device (not shown).

The first pole piece assembly 4100, the second pole piece assembly 4200, the coils 4310 and 4320 the connection pole piece assembly 4400 are identical to the first pole piece assembly 3100, the second pole piece assembly 3200, the coils 3310 and 3320 and the connection pole piece assembly 3400 shown in FIGS. 3A to 3C; and, therefore, redundant descriptions thereon will be omitted. The feature of this exemplary embodiment lies in the locations of the first pole piece assembly 4100, the second pole piece assembly 4200 and the connection pole piece assembly 4300, which are different from the locations of the first pole piece assembly 3100, the second pole piece assembly 3200 and the connection pole piece assembly 3300 shown in FIGS. 3A to 3C.

The first pole piece assembly 4100, the second pole piece assembly 4200 and the connection pole piece assembly 4400 all are adapted to hold and detach a single workpiece 1. In this exemplary embodiment, the first faces 4411 and 4421 of the connection pole piece assembly 4400 and the second faces 4212 and 4222 of the second pole piece assembly 4200 are configured to have a plane shape. However, they may have different shapes depending on the shape of the workpiece 1.

Further, the first pole piece assembly 4100 is movable along a plane extended from the second faces 4212 and 4222 of the second pole piece assembly 4200 and the first faces 4411 and 4421 of the connection pole piece assembly 4400. In other words, the first pole piece assembly 4100 is movable in the horizontal direction.

The second faces 4212 and 4222 of the second pole pieces assembly 4200 may be perpendicular to the first faces 4211 and 4221 of the second pole piece assembly 4200. Further, the first faces 4411 and 4421 of the connection pole piece assembly 4400 may be perpendicular to the second faces 4412 and 4422 of the connection pole pieces assembly 4400. As shown in FIGS. 4A to 4D, the second faces 4412 and 4422 of the connection pole piece assembly 4400 face the first faces 4211 and 4221 of the second pole piece assembly 4200, respectively, with the first pole piece assembly 4100 therebetween.

Referring to FIG. 4B, when the first pole piece assembly 4100 and the second pole piece assembly 4200 are in the second arrangement in which they are in contact with each other, with no electric current applied from the control device to the coils 4310 and 4320, a magnetic flux flows inside the magnetic circuit through the second faces 1112 and 1122 of the first pole piece assembly 1100 and the first faces 1211 and 1221 of the second pole piece assembly 1200, as indicated by the dashed lines shown in FIGS. 4B(b) and 4B(c). Therefore, in the arrangement shown in FIG. 4B, a workpiece is held neither on the first faces 4411 and 4421 of the connection pole piece assembly 4400 nor on the second faces 4212 and 4222 of the second pole piece assembly 4200.

On the other hand, when the control device applies electric current to the coils 4310 and 4320 as shown in FIG. 4C, the magnetic fluxes passing through the second faces 4112 and 4122 of the first pole piece assembly 4100 and the first faces 4211 and 4221 of the second pole piece assembly 4200 are disconnected, and magnetic fluxes passing through the second faces 4212 and 4222 of the second pole piece assembly 4200 become strong, so that the workpiece 1 can be held on the side close to the second pole piece assembly

4200. On the contrary, since the first pole piece assembly 4100 is spaced apart from the connection pole piece assembly 4400, magnetic fluxes passing through the first faces 4411 and 4421 of the connection pole piece assembly 4400 are almost zero, and thus a workpiece can hardly be held on the first faces 4411 and 4421 of the connection pole piece assembly 4400.

Thereafter, when the amplitude of the electric current applied to the coils 3310 and 3320 in the direction indicated in FIG. 4C rises above a predetermine value, the first pole piece assembly 4100 moves along the rail bolts 4001 and 4002 by magnetic force to be in contact with the connection pole piece assembly 4400. As a result, the first pole piece assembly 4100, the second pole piece assembly 4200 and the connection pole piece assembly are in the first arrangement. When the first pole piece assembly 4100 is in the first arrangement as shown in FIG. 4D, magnetic fluxes from the first permanent magnets 4130 pass through the workpiece 1, and thus the workpiece 1 can be held on the first faces 4411 and 4421 of the connection pole piece assembly 4400 as well.

Then, the magnetic fluxes once formed remain even if electric current is no more applied to the coils 4310 and 4320, as indicated by the dashed lines in FIG. 4D. Accordingly, the workpiece 1 is held on the second faces 4212 and 4222 of the second pole piece assembly 4200 and the first faces 4411 and 4421 of the connection pole piece assembly 4400.

The magnetic substance holding device 4000 according to this exemplary embodiment has an advantage in that it can hold workpieces 1 and 2 on both sides. In addition, at the time of detaching as shown in FIG. 4B, the connection pole piece assembly 4400 is spaced apart from the first pole piece assembly 4100, and a magnetic flux flows only inside the magnetic circuit in the first pole piece assembly 4100 and the second pole piece assembly 4200, leaving almost no residual magnetism.

In addition, the magnetic substance holding device 4000 according to the present invention may be modified to have stronger holding force by disposing multiple permanent magnets 4130 and 4230 on one another.

Referring to FIG. 5A, at least two first permanent magnets 4130' may be disposed between the first pole piece 4110' and each of the second pole pieces 4120', and at least two permanent magnets 4230' may be disposed between the third pole piece 4210' and each of the fourth pole pieces 4220'.

The first permanent magnets 4130' in contact with the respective second pole pieces 4120' are disposed such that their the poles of the same polarity are in contact with the same pole piece(s) (the first pole piece 4110' or the second pole pieces 4120'). The first permanent magnets 4130' in contact with the respective second pole pieces 4120' may be disposed on one another so that they can generate a strong magnetic flux as if they were a single permanent magnet.

Further, the second permanent magnets 4230' in contact with respective the fourth pole pieces 4220' are disposed such that their poles of the same polarity are in contact with the same pole piece(s) (the third pole piece 4210' or the fourth pole pieces 4220'). Further, the second permanent magnets 4230' in contact with the respective fourth pole pieces 4220' may be disposed on one another.

The permanent magnets 4130' and 4230' with their poles of the same polarity in contact with the same pole pieces may be disposed in a quadrangular shape as shown in FIG. 5A or may be disposed in a line as shown in FIG. 5B. The numbers and layouts of the permanent magnets 4130', 4230', 4130" and 4230" are not limited to those shown in FIGS. 5A and 5B, but may vary depending on design choices.

As described above, the magnetic substance holding devices 4000' and 4000" according to the variants may have more permanent magnets 4130', 4230', 4130' and 4230' per volume, so that holding force can be increased.

According to the magnetic substance holding devices (1000 to 4000) of the present invention, residual magnetism can be minimized when a workpiece is detached. In addition, by disposing coils around pole pieces instead of an additional electromagnet, strong holding force can be obtained in a simple structure, magnetic force from a permanent magnet can be controlled with small electric current at the time of switching between holding and detaching, and strong holding force can be obtained in a smaller space.

Thus far, exemplary embodiments of the present invention have been described in detail with reference to the accompanying drawings. However, the present invention is not limited to the exemplary embodiments, and modifications and variations can be made thereto without departing from the technical idea of the present invention. Accordingly, the exemplary embodiments described herein are merely illustrative and are not intended to limit the scope of the present invention. The technical idea of the present invention is not limited by the exemplary embodiments. Therefore, it should be understood that the above-described embodiments are not limiting but illustrative in all aspects. The scope of protection sought by the present invention is defined by the appended claims and all equivalents thereof are construed to be within the true scope of the present invention.

What is claimed is:

1. A magnetic substance holding device for holding and detaching a workpiece that is a magnetic substance, the device comprising:

a first pole piece assembly comprising at least one first pole piece having a first face and a second face, the first pole piece being a magnetic substance, at least two second pole pieces, each of the second pole pieces having a first face and a second face and being a magnetic substance, and at least two first permanent magnets, one of a N-pole and a S-pole of each of the first permanent magnets being in contact with the first pole piece while the other of the N-pole and the S-pole thereof being in contact with the second pole pieces, respectively;

a second pole piece assembly comprising at least one third pole piece having a first face and a second face, the third pole piece being a magnetic substance, at least two fourth pole pieces, each of the fourth pole pieces having a first face and a second face and being a magnetic substance, and at least two second permanent magnets, each one pole of opposite polarity to that of the poles of the first permanent magnets in contact with the first pole piece is in contact with the third pole piece while the pole of same polarity as that of the poles of the first permanent magnets in contact with the first pole piece is in contact with the fourth pole pieces, respectively, wherein the first face of the third pole piece faces the second face of the first pole piece while the first face of each of the fourth pole pieces faces the second face of a respective one of the second pole pieces;

at least one coil wound around at least one of the first pole piece or the third pole piece; and a control device controlling electric current applied to the coil, wherein at least one of the first pole piece assembly or the second pole piece assembly is configured to be movable such that the first pole piece assembly and the second pole piece assembly are switched between a first arrangement in which the second faces of the first pole piece assembly are spaced apart from the first faces of the second pole piece assembly, and a second arrangement in which the second faces of the first pole piece assembly come in contact with the first faces of the second pole piece assembly, and wherein the control device controls holding and detaching of a workpiece on and from the first faces of the first pole piece assembly or the second faces of the second pole piece assembly, by way of controlling electric current applied to the coil to switch between the first arrangement and the second arrangement.

2. The magnetic substance holding device of claim 1, further comprising: a base having a contact face and the base being a magnetic substance, the contact face facing the first faces of the first pole piece assembly, wherein the first faces of the first pole piece assembly come in contact with the contact face of the base when the first pole piece assembly and the second pole piece assembly are in the first arrangement, and the first faces of the first pole piece assembly are spaced apart from the contact face of the base when the first pole piece assembly and the second pole piece assembly are in the second arrangement.

3. The magnetic substance holding device of claim 1, further comprising: a base having a contact face and the base being a magnetic substance, wherein the base is disposed such that the contact face is in contact with the first faces of the first pole piece assembly.

4. A magnetic substance holding device for holding and detaching a workpiece that is a magnetic substance, the device comprising:

a first pole piece assembly comprising at least one first pole piece having a first face and a second face, the first pole piece being a magnetic substance, at least two second pole pieces, each of the second pole pieces having a first face and a second face and being a magnetic substance, and at least two first permanent magnets, one of a N-pole and a S-pole of each of the first permanent magnets being in contact with the first pole piece while the other of the N-pole and the S-pole thereof being in contact with the second pole pieces, respectively;

a second pole piece assembly comprising at least one third pole piece having a first face and a second face, the third pole piece being a magnetic substance, at least two fourth pole pieces, each of the fourth pole pieces having a first face and a second face and being a magnetic substance, and at least two second permanent magnets, each one pole of opposite polarity to that of the poles of the first permanent magnets in contact with the first pole piece is in contact with the third pole piece while the pole of same polarity as that of the poles of the first permanent magnets in contact with the first pole piece is in contact with the fourth pole pieces, respectively, wherein the first face of the third pole piece faces the second face of the first pole piece while the first face of each of the fourth pole pieces faces the second face of a respective one of the second pole pieces;

a connection pole piece assembly comprising at least one first connection pole piece having a first face and a second face and being a magnetic substance, and at least two second connection pole pieces, each of the second connection pole pieces having a first face and a second face and being a magnetic substance, wherein the second face of the first connection pole piece faces the first face of the first pole pieces, and the second face of each of the second connection pole pieces faces the first face of the respective one of the second pole pieces;

at least one coil wound around at least one of the first pole piece or the third pole piece; and a control device controlling electric current applied to the coil, wherein at least one of the first pole piece assembly, the second pole piece assembly or the connection pole piece assembly is configured to be movable such that the first pole piece assembly, the second pole piece assembly and the connection pole piece assembly are switched between a first arrangement in which the second faces of the first pole piece assembly are spaced apart from the first faces of the second pole piece assembly while the first faces of the first pole piece assembly come in contact with the second faces of the connection pole piece assembly, and a second arrangement in which the second faces of the first pole piece assembly come in contact with the first faces of the second pole piece assembly while the first faces of the first pole piece assembly are spaced apart from the second faces of the connection pole piece assembly, and wherein the control device controls holding and detaching of a workpiece on and from the first faces of the connection pole piece assembly or the second faces of the second pole piece assembly, by way of controlling electric current applied to the coil to switch between the first arrangement and the second arrangement.

5. The magnetic substance holding device of claim 4, wherein the first faces of the connection pole piece assembly and the second faces of the second pole piece assembly are configured to hold and detach a single workpiece.

6. The magnetic substance holding device of claim 5, wherein the first pole piece assembly is movable along a plane extended from the second faces of the second pole piece assembly and the first faces of the connection pole piece assembly.

7. The magnetic substance holding device of claim 4, wherein at least two first permanent magnets are disposed between the first pole piece and each of the second pole pieces, and at least two second permanent magnets are disposed between the third pole piece and each of the fourth pole pieces.

8. The magnetic substance holding device of claim 7, wherein the first permanent magnets are disposed in a line between the first pole piece and each of the second pole pieces, and the second permanent magnets are disposed in a line between the third pole piece and each of the fourth pole pieces.

9. The magnetic substance holding device of claim 1, wherein the first pole piece assembly comprises at least two first pole pieces, the second pole piece assembly comprises at least two third pole pieces, at least one first permanent magnet is disposed between each of the first pole piece and a respective one of the second pole pieces, and at least one second permanent magnet is disposed between each of the third pole piece and a respective one of the fourth pole pieces.

10. The magnetic substance holding device of claim 1, wherein an area of the first face of each of the fourth pole pieces is smaller than an area of the second face of a respective one of the second pole pieces, and an area of the second face of each of the fourth pole pieces is smaller than an area of the first face of a respective one of the fourth pole pieces.

11. The magnetic substance holding device of claim 2, further comprising: a rail bolt fixed to the first pole piece assembly and to the base while penetrating the second pole piece assembly so that the second pole piece assembly slides along the rail bolt.

12. The magnetic substance holding device of claim 4, further comprising: a rail bolt fixed to the first pole piece assembly and to the connection pole piece assembly while penetrating the second pole piece assembly so that the second pole piece assembly slides along the rail bolt.

13. The magnetic substance holding device of claim 4, wherein the first pole piece assembly comprises at least two first pole pieces, the second pole piece assembly comprises at least two third pole pieces, at least one first permanent magnet is disposed between each of the first pole piece and a respective one of the second pole pieces, and at least one second permanent magnet is disposed between each of the third pole piece and a respective one of the fourth pole pieces.

14. The magnetic substance holding device of claim 4, wherein an area of the first face of each of the fourth pole pieces is smaller than an area of the second face of a respective one of the second pole pieces, and an area of the second face of each of the fourth pole pieces is smaller than an area of the first face of a respective one of the fourth pole pieces.

* * * * *